A. G. BAKER.
TYPE SETTING MACHINE.
APPLICATION FILED DEC. 30, 1907.

1,045,360.

Patented Nov. 26, 1912.

Witnesses
Clora E. Braden
Gertrude Tallman

Inventor
Arthur G. Baker
By Chappell & Earl
Attorneys

COLUMBIA PLANOGRAPH CO., WASHINGTON, D. C.

UNITED STATES PATENT OFFICE.

ARTHUR G. BAKER, OF ALBION, MICHIGAN, ASSIGNOR TO THE UNIVERSAL MACHINE COMPANY, OF ALBION, MICHIGAN.

TYPE-SETTING MACHINE.

1,045,360.      Specification of Letters Patent.      Patented Nov. 26, 1912.

Application filed December 30, 1907. Serial No. 408,543.

*To all whom it may concern:*

Be it known that I, ARTHUR G. BAKER, a citizen of the United States, residing at the city of Albion, county of Calhoun, State of Michigan, have invented certain new and useful Improvements in Type-Setting Machines, of which the following is a specification.

This invention relates to improvements in type-setting machines, and it relates particularly to improvements in those machines which not only set the type, but distribute the type from a mass of type that has already been used and then select the type from the channels of the type case and set them. That portion of the machine which sets the type could be used after the type had been otherwise distributed into the channels of the type case; and the distributer could be used for distributing type to channels of any appropriate type case which might be set by other means, yet the devices are especially designed to coöperate together and are so combined and arranged that no power is required other than that which comes from the fingers of the operator on the key-board to operate the same. The carriage and magazine of the distributer are returned to the initial position by means of a handle or lever thereon. The type, after they are set, are justified by hand and passed to a galley, which transfer to the galley may be accomplished by hand or by a special machine for the purpose.

The objects of this invention are,—first, to provide a complete type-distributing and setting machine which can be effectively operated by the hand of the operator from a key-board, without motor or other power; second, to provide an improved construction and arrangement of parts and an improved connection for actuating the distributer and setting up the type simultaneously from the single key-board; third, to provide an improved construction and arrangement of type-channels in the type case magazine for a type-setting machine; fourth, to provide an improved construction and arrangement of type distributer whereby the free delivery of the type from the carriage to the channels of the type case is insured; fifth, to provide an improved construction and arrangement of the type distributer and carriage whereby the carriage will be properly manipulated and controlled in returning it to its initial position; sixth, to provide an improved construction of escapement mechanism for controlling the passage of the type distributer carriage over the selectors for distributing the type to the channels of the type case; seventh, to provide an improved construction of type case for receiving the type from the distributer carriage; eighth, to provide an improved construction of race plate or apron over which to pass the type from the type channels of the case to the composing stick; ninth, to provide an improved construction of ejector and mechanism for ejecting the type from the type channels to the race plate or apron; tenth, to provide an improved construction of guide or guiding comb to insure the proper arrangement and guiding of the type as they are ejected from the channels to the race plate or apron to be delivered to the composing stick; and eleventh, to provide an improved setting up mechanism for taking the type from the race plate or apron and setting them in the composing stick.

Further objects, and objects relating to mere details, will definitely appear from the detailed description to follow.

I accomplish the objects of my invention by the means and mechanism described in the following specification.

The invention is clearly defined and pointed out in the claims.

A structure embodying the features of my invention is clearly illustrated in the accompanying drawings, forming a part of this specification, in which.

In the drawings, similar numerals of reference refer to similar parts throughout the several views. The sectional views are taken looking in the direction of the little arrows at the ends of the section lines.

Referring to the numbered parts of the drawing, a square base frame 1 is provided, which supports the remaining portions of the mechanism, this base being intended to rest upon a suitable standard table or desk at convenient height for the operator. This base carries an upright frame 2 toward the back of the same, which upright frame supports the type-case channels and other parts. Across the top of the frame is the support 3 carrying ways for the type-distributer carriage 4. An apron 5 for receiving the type is supported at the front of this frame 2, and the type are delivered down across the same and set up at the composing stick 6. The various parts are controlled from the key-board 7 toward the front of the frame 1. The type are distributed from the carriage 4, which is propelled along the ways on the support 3, by a suitable weight or other means, controlled by a suitable escapement mechanism which is actuated by suitable connections to the key levers.

Figures 5, 6, 7, 8:
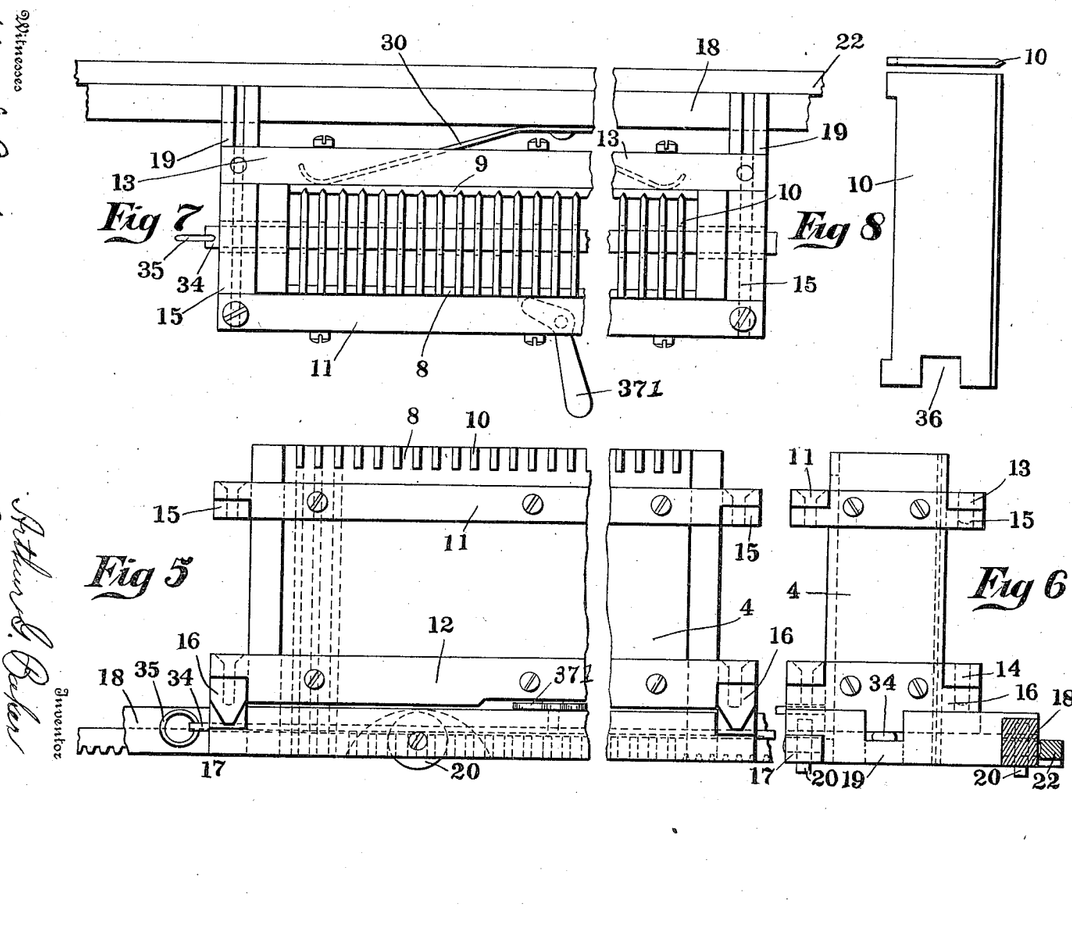
Fig. 5 is an enlarged detail front elevation view of the type distributer carriage.
Fig. 6 is a detail end view of the type distributer carriage as it appears from the right of Figs. 5 and 7.
Fig. 7 is a plan view of the same in broken section.
Fig. 8 is a detail view of one of the partitions for separating the lines of type of the galley of "dead matter" and for supporting the type in the magazine of the said type distributer carriage.

The type distributer carriage is provided with a type-holder for carrying "dead matter" for distribution of the type, which consists of a front plate 8 and a back plate 9, and cross partitions 10, which are interposed between the said front and back plate to form compartments for the separated lines of type from "dead matter." The front and back plates are notched to receive the cross partitions. The front plate 8 is secured to the top bar 11 and bottom bar 12 by suitable screws, and the plate 9 is also similarly held in position on the rear top bar 13 and bottom bar 14. Top cross bars 15 connect the top bars 11 and 13 together, and cross bars 16 connect the bottom bars 12 and 14 together. The bottom bars 16 are shaped to fit into and reciprocate in suitable ways on the carriage frame beneath. The carriage frame consists of a longitudinal front bar 17 and a rear bar 18, having cross bars 19 with guide ways in their upper surface to receive the bottom bars 16 of the said typeholder. Rollers or wheels 20 are provided under the front and rear bars or rails 17 and 18, which travel in suitable grooves or ways 21 on the support 3, whereby the carriage is accurately guided in a premeditated longitudinal path. A rack 22 is provided on this carriage, secured to the back side of the rear rail 18, and this rack 22 meshes with the pinion 23, which is carried by a suitable journal consisting of a shouldered screw 24 set into the back side of the top 3 of the frame. Preferably integral with this pinion 23 is an escapement wheel 25 of a ratchet design, which is released step by step by the action of the dogs 26—27 supported on the dog block 28, which is supported to oscillate on the journal 29. The lines of type of "dead matter" are supported between the partitions 10, and the type are nicked for testing on the wards of the channels of the type case beneath so that as the carriage passes step by step, due to the actuation of the escapement, the entire mechanism receives a jar which causes the type to readily settle in the compartments and the slight jar insures that the type will drop completely to the bottom of the channels of the type case so that there will certainly always be a type in position to be ejected by the ejector. The type holder of this distributer is held normally toward the front of the machine by a spring 30. A lever handle 371 (see Figs. 5 and 7) is pivoted to the front bar 17 of the carriage frame, and the short end of the lever contacts with the central part of the front of the typeholder, whereby when it is desired to return the type carriage to the original position, the first operation of the lever offsets the type-holder so that none of the type will longer register with the line of the top openings of the channels beneath, thus permitting the carriage to be returned to its initial position. The dogs 26 and 27 of the escapement are held yieldingly together by a spring 26' so that the escapement wheel passes readily between them and permits the return of the carriage to the initial position. The carriage is propelled by a weight 32 connected by a cable or tape 33 to the said carriage frame. The "dead matter" is put into the type-holder of the carriage and is supported temporarily above the upper ends of the channels of the type case by a rod or bar 34, having a ring 35 in its end by which it may be readily withdrawn and allow the type to descend on the top plate or bar 3, so that as the carriage moves along step by step, the bottom type in each compartment can be tested by the wards of the channels. The partitions 10 are notched at their bottom 36 to permit the passage of the bar 34 and the withdrawal of the same. The partitions 10 are wedge shaped on one edge so that they can be readily inserted between the lines of the type constituting a plate of "dead matter," and after they are thus inserted between the lines, the side plates are put in place and the holder is then put upon the carriage, and the side plates secured in place by the screws through the frame bars heretofore referred to. This avoids the necessity of putting the type in the compartments one at a time because the full line is properly held in place by the insertion of the compartments and any lead between the lines can be removed. By carefully gaging the thickness of the partitions 10 and locating the same, the compartments of this type-holder can be made to register perfectly with the openings leading to the channels of the type case. The opposite sides of the partitions are provided with tenon-engaging notches on the plate 8.

Figures 12, 13:
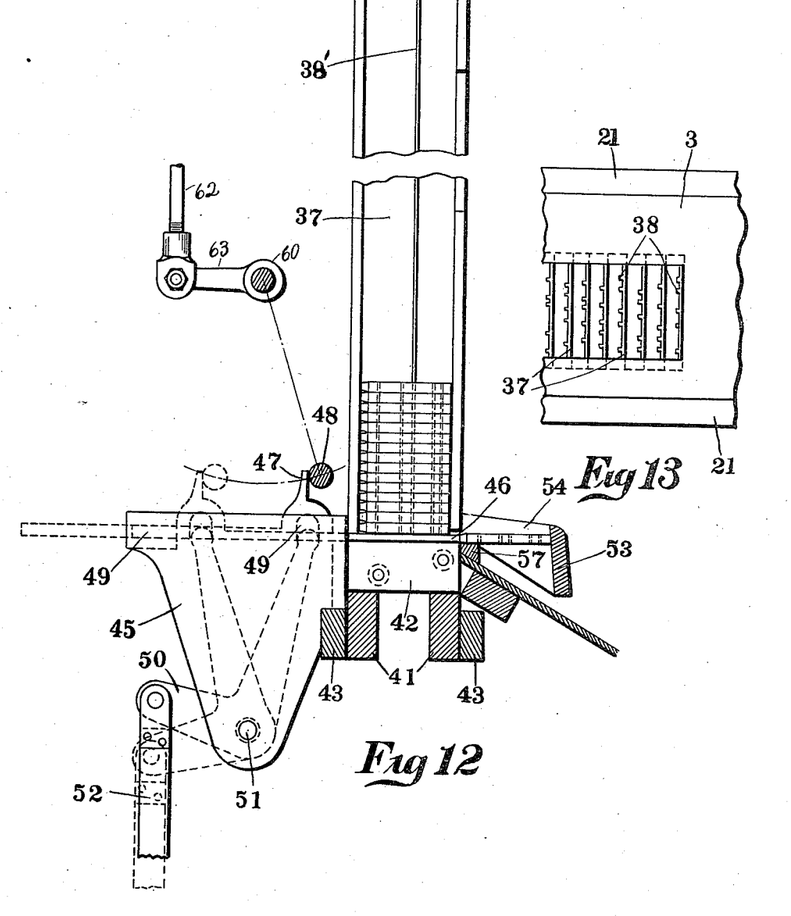
Fig. 12 is an enlarged detail sectional elevation view taken on the line 6—6 of Figs. 1 and 4, looking toward the left, showing details of construction of the type channels and the arrangement and connections of the ejector and the details of the actuating means for the escapement mechanism; the diagonal angle bars of the frame being omitted.
Fig. 13 is a plan view of a portion of the type case or magazine showing the wards which engage the nicks in the type for the purpose of selecting and guiding the same.
Figure 14:
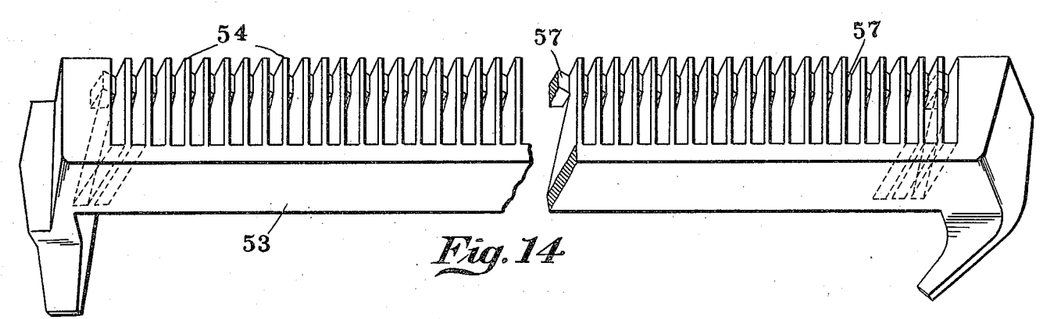
Fig. 14 is an enlarged detail perspective view in sections of the guiding comb for delivering the type onto the race plate or apron.
Figures 15, 16:
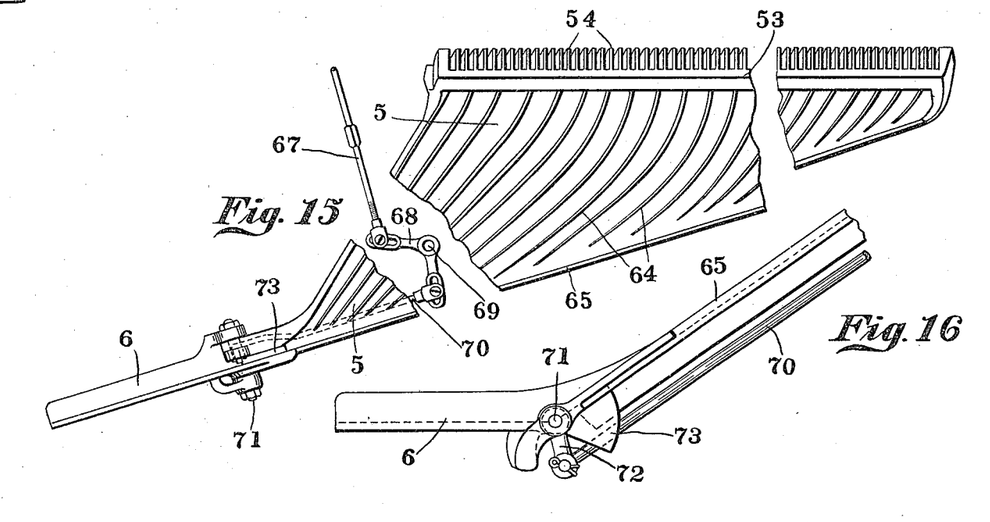
Fig. 15 is a detail plan view of the apron, portions being broken away to show the details of the setting up means.
Fig. 16 is a detail view of the setting up means and composing stick.

This brings us to a consideration of the details of construction of the type case, which is made up of sections, having channels grooved in their sides, portions of the said channels being cut away at intervals on the front side of the machine so that the operator can readily see whether the channels contain type ready to be acted upon by the ejector. A side view of the channel plates 37 appears in Fig. 12, which is an enlarged detail sectional view of line 6—6 of Figs. 1 and 4. The channels are cut with short wards 38 at the top for testing the type in selecting the same from the mass of "dead matter" in the type distributer carriage, and a single rib or ward 38' extends from top to bottom of the channel to insure the guiding of the type to the bottom of the channel. These channels are placed side by side so that the apertures are exactly in line. The details of construction of the said wards appear in Fig. 13. The type that go into each channel are correspondingly notched so that their proper distribution is insured by the passage of the type distribution carriage over them as indicated.

The channel plates are held side by side and supported by the frame work 2. Diagonal bars 39 extend from the upper right hand end of the top plate 3 downwardly diagonally across the frame 2 and support these channel plates 37 between them. The opposite end of the top bar or plate 3 is supported by braces 40. The diagonal supports 39 are not indicated in Fig. 12, being omitted for the purpose of clearness. Beneath the lower ends of the channel plates extend frame bars 41, and supported on these bars 41 are transverse bottom bars 42 arranged directly beneath each type channel of the type case. The front flange of the channel bar 27 is cut away leaving an aperture at that point of a height slightly in excess of the width of the type so that when the proper type descend in their appropriate channel, the bottom type can be ejected forwardly by a suitable ejector or plunger, which is of slightly less thickness than the width of the type. The type descend with their faces toward the rear of the machine.

The bars 41 are reinforced by additional bars 43—44, which extend diagonally of the frame 2. Secured on the bars 41—43 is an ejector mechanism, there being an ejector plunger and appropriate mechanism for each type channel. This mechanism consists of a thin plate 45, which is secured to the back side of the bars 41—43. The ejector plunger 46 is supported in suitable ways at the top of the plate 45, and has an upwardly-projecting finger 47 which contacts with a universal bar 48 for operating the escapement mechanism. The under side of the ejector plunger is notched at 49, and the bell-crank lever 50 is pivoted at 51 toward the lower part of the plate 45, and this plunger is actuated by a pitman or link 52, which extends downwardly therefrom and is connected to the rear ends of the finger levers controlled from the keyboard.

To the front of the type case is supported a comb member 53, which is supported in an oblique relation at an appropriate height to receive the type when they are ejected from the type channels. The teeth 54, of the comb, so to speak, are vertical, while the body of the comb is oblique, and is supported adjustably in position by set-screws 55—56. The length of the teeth is slightly in excess of the length of the type, and the back of the comb forms a stop or buffer which checks the motion of the type, no matter how quickly it may have been ejected from the bottom of the type channel. The space between the teeth 54 is of such size that the teeth engage and guide the type so that the foot drops down properly guided into contact with the race plate or apron 5.

The upper end of the type is still extended up within the teeth of the comb by the support 57, which is placed at the same height as the bottom plate 42, so it will be observed that the type descends gently onto the apron, effectively guided by the teeth 54 without danger of its being disarranged and descends quickly over the race plate to the proper point to be set up in the composing stick.

The ejector is actuated from the key-board by levers 58 of the key-board which are supported on the fulcrum 59 so that when the forward ends of the levers 58 are depressed, the rear ends of the levers are each thrown upwardly, which acts, by its appropriate pitman 52 on the bent lever 51 for actuating the ejector plunger 46.

Extending diagonally down the rear of the machine is a common bar or rod 48, positioned to be acted upon by the fingers 47 extending upwardly from the ejector plunger 46. This common bar is connected to actuate the rock-shaft 60, the said common bar being connected thereto by the rock-shaft arm 60'—60'. On the rock-shaft 60 is a rearwardly-extending rock-shaft arm 61, which is connected by a link 62 to the laterally extending arm 63 of the dog block 28, so that on each motion of an ejector plunger, the dog block of the escapement will be rocked and the distributer carriage will be advanced one notch or one step by its propelling means or weight, and, of course, as it is actuated by a weight or spring, it will slightly jar or agitate the entire machine. This has the effect before mentioned of causing all type to descend in their compartments or channels, and insures that any type descending from the distributer holder will be shaken into its appropriate channel beneath, where the same agitation will cause it to further descend entirely to the bottom of the channel.

Figure 1:
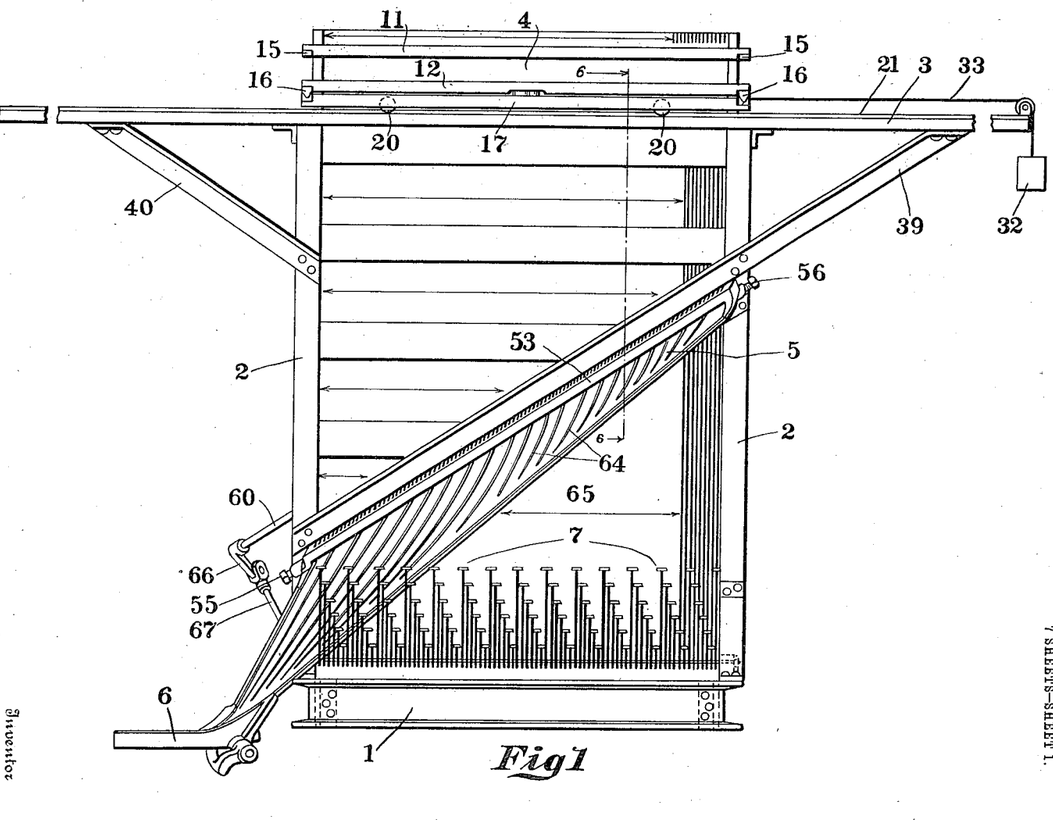
Figure 1 is a front elevation view of my improved type-setting machine, the top rail and track or ways for the type distributer carriage being shown in broken sections.
Figures 2, 9, 10, 11:
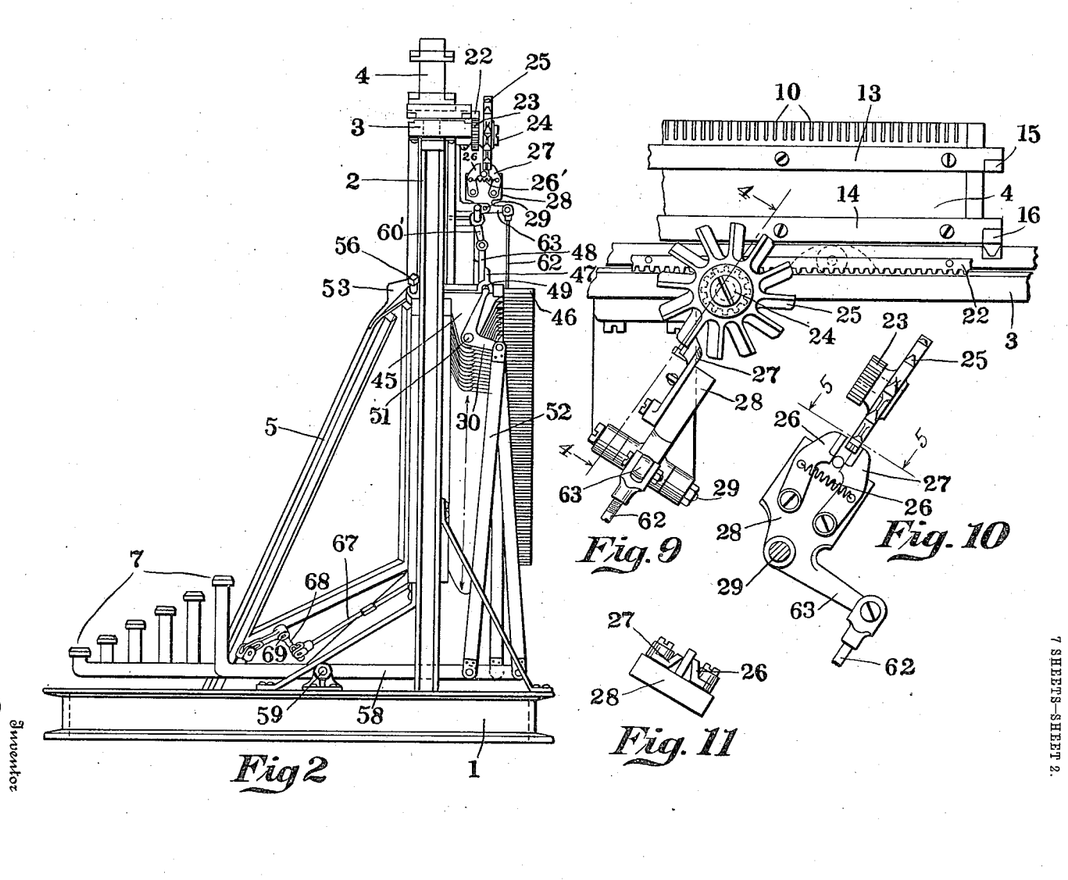
Fig. 2 is a side elevation view of the same taken from the right hand of Fig. 1.
Fig. 9 is an enlarged detail view showing the arrangement of the escapement mechanism for permitting the step-by-step feeding of the type distributer carriage.
Fig. 10 is a detail view, partially in section, on a line corresponding to line 4—4 of Fig. 9.
Fig. 11 is a view of the escapement dogs looking downwardly from the plane indicated by the line 5—5 of Fig. 10.
Figure 3:
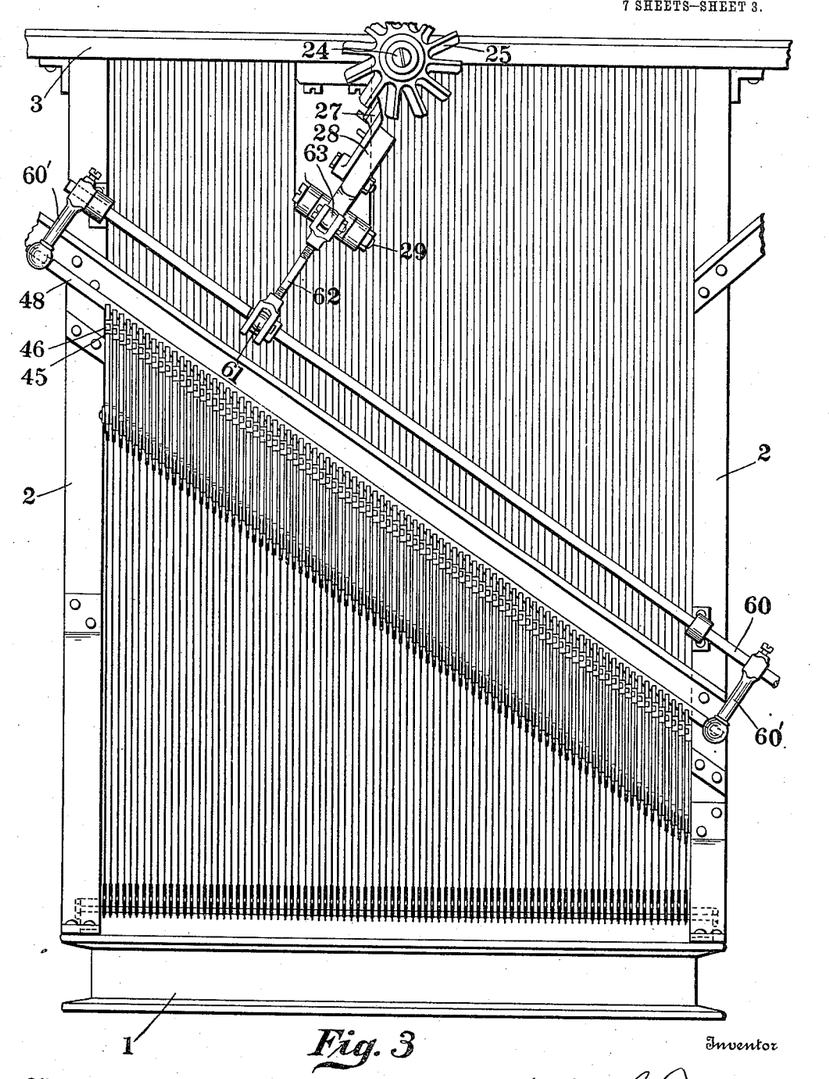
Fig. 3 is a rear elevation view of the machine, the top rail and ways for the type distributer carriage being broken as in Fig. 1.
Figure 4:
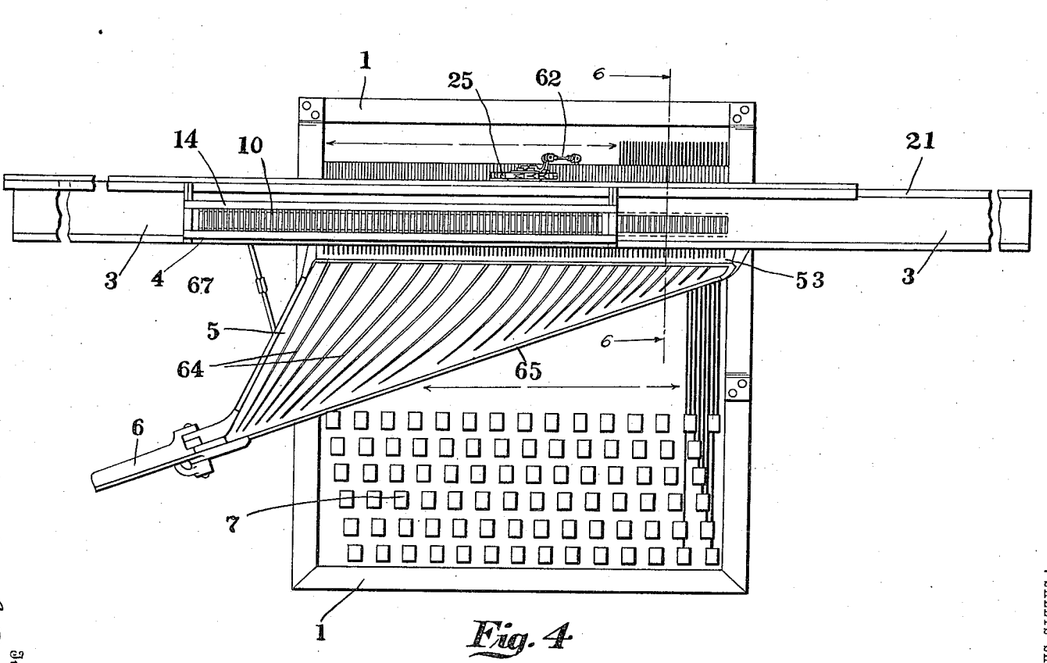
Fig. 4 is a plan view of the complete machine, the ends of the said top rail and ways for the type distributer carriage being broken away.

The apron or race-way 5 for the type extends up beneath the comb 53, and the reason for the body of the comb being inclined is to properly deliver the type to this apron or race-way. The race-way is divided up into channels by ribs 64, these being located at intervals, forming channels that take in a width of about four of the comb teeth, or guiding means 54. This prevents any possibility of the type turning end for end as it slides down, and as these guiding ribs 64 have vertical sides, they serve to receive the type after it starts on its downward course and guide the same effectively. The reason for making the right hand end of the apron or race-way the highest, is that the time for the type to descend to the composing stick after it is ejected should be substantially uniform, whether the same is ejected at the right hand end or the left hand end of the type case. A reference to Figs. 1, 2 and 4 shows that the type from the left hand channel will pass over a very short course and a very gentle incline, whereas type ejected from the right hand will pass over a much longer course, but on a greatly increased or steep incline, and this has been carefully considered, adjusted and tested, so that it is found that a type ejected from the bottom of any channel will require substantially the same time to descend to the setting-up device that will pass it to the composing stick.

A guide rib 65 is at the front of the race-plate or apron, and guides the type from the various channels formed by the ribs 64 to a common point in front of the setting-up mechanism. The setting-up mechanism is actuated from the rock-shaft arm 66 on the rock-shaft 60, the same being connected by a suitable rod or pitman 67 to a bent or bell-crank lever 68 pivoted at 69, which communicates motion to a rod or pitman 70 that actuates the setting-up mechanism. The composing stick 6 is, in effect, an extension of the race plate 4 and its guide rib 65. The setting-up device is pivoted at 71 and is operated by actuation of the arm 72 from the connecting rod or pitman 70. The setting-up device consists of a segment of a circular plate 73, the front side of which drops below or just even with the bottom of the race-plate or apron 4 so that a type traveling foot first will slide upon the same when it comes to the bottom of the race-plate, and when the setting-up device 73 is actuated, the type will be raised to a vertical position, face up, when on releasing the fingers from the key-board, the setting-up device will drop back to receive the next type. If a number of type have been started, they will be end to end at this place and will be set up successively in their proper order, the race-way extending sufficiently beyond the guide channels to admit of a number of type resting against the guide rail 65. When a line of type is set up in the composing stick, they may be transferred to the galley by hand, or mechanism may be provided for transferring them to the galley. So far as the present invention is concerned, no attempt is made to justify the type, such justifying being accomplished by hand work and not by the machine.

After considering this description of the machine, it will be noted that a mechanism is provided which is of such a simple and effective character and so inexpensive to manufacture, that the desideratum, a one-man type-setting machine, has been substantially accomplished, because, owing to the moderate cost of the machine, the expense of using a machine is not prohibitive in a printing shop where but a single compositor is employed.

I believe I have produced a type-setting machine which is entirely practical both for distributing and setting type at the same operation. I believe that the mechanism I have produced accomplishes this effectively without the use of any motor or propelling power further than the fingers and hands of the operator, although I believe that the same mechanism might profitably be employed in connection with certain motor devices, and while I claim the same as applicable and effective in producing a type-setting machine in which no motor is required, and in which both the distribution and setting is accomplished, I wish it also understood that I claim the mechanism generally.

I wish to remark, also, that my improvement effectively accomplishes the placing of "dead matter" in a distributer in such a way that the type of said "dead matter" can be readily selected without the necessity of keeping a separate machine and operator employed for the distribution, and the machine being so economical to manufacture, the stopping of the same while the operator justifies the lines will not be found burdensome, although, of course, the most effective work would be accomplished by using a number of these machines and have a skilful type-setter justify the lines and insert the headings in italics, and have still another assistant who would put the "dead matter" in the distributers, which can be accomplished at a very rapid rate by my improved devices.

I have described details of construction which I have found to be effective from actual experience in use in this improved typesetting machine. I desire to remark, however, that from observing machines of this class, and also the mechanism of various typewriters, I am aware that there are many equivalents that could be employed for certain of the devices that I have employed and illustrated, besides other changes which will occur to a skilful mechanic. I state, therefore, that I desire to claim the improvements that I have produced broadly as well as the specific embodiment of the same, which I have illustrated and described in this patent specification.

Having thus described my invention, what I claim as new and desire to secure by Letters Patent, is:

1. In a composing machine, the combination of a suitable frame-work; a type-case arranged within the frame-work containing and consisting of suitable type-channels open at their upper ends and provided with wards for testing and guiding the type, and with lateral apertures for the discharge of the type at the bottom; a top rail across the top of the frame, with its upper face even with the tops of the type channels and provided with suitable ways; a type-distributer carriage with a main frame to travel on said ways and having a type-holder adjustable laterally on said main frame, for shifting the type out of the line of the top openings of the channel to permit the return of the carriage to its initial position; a spring for retaining the type holder in its initial position; a lever handle for shifting the type holder against the said spring and to manipulate the carriage; means of urging the carriage yieldingly forward; and an escapement mechanism to permit a step-by-step movement of the said carriage for delivering the type from the distributer carriage to the channels of the type-case, substantially as described.

2. In a composing machine, the combination of a suitable frame-work; a type-case arranged within the frame-work containing and consisting of suitable type-channels open at their upper ends and provided with wards for testing and guiding the type, and with lateral apertures for the discharge of the type at the bottom; a top rail across the top of the frame, with its upper face even with the tops of the type channels and provided with suitable ways; a type-distributer carriage with a main frame to travel on said ways and having a type-holder adjustable laterally on said main frame, for shifting the type out of the line of the top openings of the channel to permit the return of the carriage to its initial position; means of urging the carriage yieldingly forward, and an escapement mechanism to permit a step-by-step movement of the said carriage for delivering the type from the distributer carriage to the channels of the type-case, substantially as described.

3. In a composing machine, the combination of a suitable frame-work; a type-case arranged within the frame-work, consisting of suitable type-channels open at their upper ends and provided with wards for testing and guiding the type, and with lateral apertures for the discharge of the type at the bottom; a top rail across the top of the frame, with its upper face even with the tops of the type-channels and provided with suitable ways; a type-distributer carriage with a main frame to travel on said ways and having a type-holder adjustable laterally on said main frame, for shifting the type out of the line of the top openings of the channel to permit the return of the carriage to its initial position; a spring for retaining the type-holder in its initial position, and a lever handle for shifting the type holder against the said spring and to manipulate the carriage, substantially as described.

4. In a composing machine, the combination of a suitable frame-work; a type-case arranged within the frame-work containing and consisting of suitable type-channels open at their upper ends and provided with wards for testing and guiding the type, and with lateral apertures for the discharge of the type at the bottom; a top rail across the top of the frame, with its upper face even with the tops of the type-channels and provided with suitable ways; and a distributer carriage with a main frame to travel on said ways and having a type-holder adjustable laterally on said main frame, for shifting the type out of the line of the top openings of the channel to permit the return of the carriage to its initial position, substantially as described.

5. In a composing machine, the combination of a suitable frame-work; a type-case arranged within the frame work containing and consisting of suitable type-channels open at their upper ends and provided with wards for testing and guiding the type, and with lateral apertures for the discharge of the type at the bottom; a top rail across the top of the frame, with its upper face even with the tops of the type-channels and provided with suitable ways; a type-distributer carriage with a main frame to travel on said ways and having a type-holder adjustable laterally on said main frame, for shifting the type out of the line of the top openings of the channel to permit the return of the carriage to its initial position; a spring for retaining the type holder in its initial position; a lever handle for shifting the type holder against the said spring and to manipulate the carriage; said type holder consisting of front and rear plates supported in a suitable frame, with removable transverse partitions fitted into notches in the said front and rear plate, whereby the said partitions may be inserted between lines of dead matter and the plates clamped thereto to form type compartments, and a removable bar arranged longitudinally of the bottom of said type holder for permitting the type to drop onto the mouths of suitable channels of the type-case for distributing the same; and means of moving the said carriage step-by-step over the mouths of the type-channels of the type-case, substantially as described.

6. In a composing machine, the combination of a suitable frame-work; a type-case arranged within the frame-work containing and consisting of suitable type-channels open at their upper ends and provided with wards for testing and guiding the type, and with lateral apertures for the discharge of the type at the bottom; a top rail across the top of the frame, with its upper face even with the tops of the type-channels and provided with suitable ways; a type-distributer carriage with a main frame to travel on said ways and having a type-holder adjustable laterally on said main frame, for shifting the type out of the line of the top openings of the channel to permit the return of the carriage to its initial position; and a removable bar arranged longitudinally of the bottom of said type holder for permitting the type to drop onto the mouths of suitable channels of the type-case for distributing the same; and means of moving the said carriage step-by-step over the mouths of the type-channels of the type-case, substantially as described.

7. In a composing machine, the combination of a suitable frame-work; a type-case arranged within the frame-work containing and consisting of suitable type-channels open at their upper ends and provided with wards for testing and guiding the type, and with lateral apertures for the discharge of the type at the bottom; a top rail across the top of the frame, with its upper face even with the tops of the type channels and provided with suitable ways; a type-distributer carriage with a main frame to travel on said ways and having a type-holder adjustable laterally on said main frame, for shifting the type out of the line of the top openings of the channel to permit the return of the carriage to its initial position; a spring for retaining the type-holder in its initial position; a lever handle for shifting the type holder against the said spring and to manipulate the carriage, and means of moving the said carriage step-by-step over the mouths of the type-channels of the type-case, substantially as described.

8. In a composing machine, the combination of a suitable frame-work; a type-case arranged within the frame-work containing and consisting of suitable type-channels open at their upper ends and provided with wards for testing and guiding the type, and with lateral apertures for the discharge of the type at the bottom; a top rail across the top of the frame, with its upper face even with the tops of the type channels and provided with suitable ways; a type-distributer carriage with a main frame to travel on said ways and having a type-holder adjustable laterally on said main frame, for shifting the type out of the line of the top openings of the channel to permit the return of the carriage to its initial position, and means of moving the said carriage step-by-step over the mouths of the type-channels of the type-case, substantially as described.

9. In a composing machine, the combination with suitable framework, of a type-case made up of suitable channels for selecting and receiving the type; a top rail across the frame with its upper face even with the tops of the type-channels and provided with suitable ways; a type distributer carriage with compartments for the type arranged to travel on the ways on the top rail for delivering the type to the type channels; means of urging the carriage yieldingly forward; an escapement mechanism to permit a step-by-step movement of the said carriage for delivering the type from the distributer carriage to the channels of the type-case; the escapement mechanism consisting of a rack on the type distributer carriage; a pinon on the frame of the machine; a ratchet escapement wheel, and an oscillating dog-block with a pair of yielding dogs whereby the type carrier is jarred to drop the type, substantially as described.

10. In a composing machine, the combination with a suitable framework, of a type case made up of suitable channels for selecting and receiving the type; a type distributer carriage with compartments for the type arranged for delivering type to the type channels; means of urging the carriage yieldingly forward; an escapement mechanism to permit a step-by-step movement of the said carriage for delivering the type from the distributer carriage to the channels of the type case, the escapement mechanism consisting of a rack on the type distributer carriage; a pinion on the frame of the machine; a ratchet escapement wheel; and an oscillating dog-block with a pair of yielding dogs whereby the type carrier is jarred to drop the type, substantially as described.

11. In a composing machine, the combination with suitable frame-work, of a type-case made up of suitable channels for selecting and receiving the type; a top rail across the frame with its upper face even with the tops of the type channels and provided with suitable ways; a type distributer carriage with compartments for the type arranged to travel on the ways on the said top rail for delivering the type to the type channels; means of urging the carriage yieldingly forward; and an escapement mechanism to permit a step-by-step movement of the said carriage whereby the type carrier is jarred to drop the type; for delivering the type from the said distributer carriage to the channels of the type-case, substantially as described.

12. In a composing machine, the combination with suitable frame-work, of a type-case made up of suitable channels for selecting and receiving the type; a type distributer carriage with compartments for the type arranged for delivering type to the type channels; means of urging the carriage yieldingly forward; and an escapement mechanism to permit a step-by-step movement of the said carriage whereby the type carrier is jarred to drop the type; for delivering the type from the distributer carriage to the channels of the type case, substantially as specified.

13. In a composing machine, the combination with a suitable frame-work, of a type-case made up of suitable channels for selecting and receiving the type; suitable ways above the said type channels; a type distributer with suitable compartments arranged to travel on the ways above the said type channels; means for yieldingly advancing the type distributer, and escapement means for permitting the same to advance step-by-step whereby the type carrier is jarred to drop the type, as specified.

14. The combination of a type case, consisting of type channels; ejectors for ejecting the type laterally therefrom; a comb-like guide, the back of which serves as a buffer, and the spaces between the teeth of which are vertical and receive the type and guide the same; and a race-plate beneath the said guide for receiving the said type to deliver them to a composing-stick, substantially as described.

15. The combination of a type-case, consisting of type-channels of graded length, so that their upper ends are on the same level and their lower ends are of graded heights; ejectors for ejecting the type laterally therefrom; an inclined comb-like guide, the back of which serves as a buffer, and the spaces between the teeth of which are vertical and receive the type and guide the same; and a race-plate beneath the said guide for receiving the said type to deliver them to a composing-stick, substantially as described.

16. In a composing machine, the combination of type-channels of graded lengths, whereby the bottoms thereof are in an inclined line; a race-plate or apron, the rear edge of which is inclined to correspond to the bottoms of the said type channels, the same being inclined downwardly and forwardly and having a guiding rib downwardly and across the front and ribs upon the face thereof, forming channels for the guiding of the type; ejectors for delivering the type from the type channels onto the race-plate; guiding means for the type to the said race-plate; a composing-stick constituting an extension of the said race-plate; and a setting-up device consisting of a rocking segment at the front of the composing-stick and connections from said segment to the key-board, co-acting for the purpose specified.

17. In a composing machine, the combination of type-channels of graded lengths, whereby the bottoms thereof are in an inclined line; a race-plate or apron, the rear edge of which is inclined to correspond to the bottoms of the said type channels, the same being inclined downwardly and forwardly and having a guiding rib downwardly and across the front; ejectors for delivering the type from the type channels onto the race-plate; guiding means for the type to the said race-plate, and a composing-stick constituting an extension of said race-plate, co-acting for the purpose specified.

18. In a composing machine, the combination of type-channels of graded lengths, whereby the bottoms thereof are in an inclined line; a race-plate or apron, the rear edge of which is inclined to correspond to the bottoms of the said type channels, the same being inclined downwardly and forwardly and having a guiding rib downwardly and across the front; ejectors for ejecting the type from the type channels onto the race-plate, and a composing-stick constituting an extension of said race-plate, coacting for the purpose specified.

19. In a composing machine, the combination of type-channels of graded lengths, whereby the bottoms thereof are in an inclined line; a race-plate or apron, the rear edge of which is inclined to correspond to the bottoms of the said type channels, the same being inclined downwardly and forwardly and having a guiding rib downwardly and across the front; ejectors for delivering the type from the type channels onto the race plate, and a composing-stick to receive said type, coacting for the purpose specified.

20. In a composing machine, the combination of type channels of graded lengths whereby the bottoms thereof are in an inclined line; a race plate or apron, the rear edge of which is inclined to correspond to the bottoms of said type channels, the same being inclined downwardly and forwardly and provided with guide means to direct the type across the front; ejectors for delivering the type from the type channels on to the race plate; buffers to check the type as they are delivered to the race plate whereby they will drop by the force of gravity; and a composing stick constituting an extension of said race plate, as specified.

In witness whereof, I have hereunto set my hand and seal in the presence of two witnesses.

ARTHUR G. BAKER. [L. S.]

Witnesses:
C. A. Bacon,
B. K. Ford.

---

Copies of this patent may be obtained for five cents each, by addressing the "Commissioner of Patents, Washington, D. C."